(12) United States Patent
Kim

(10) Patent No.: US 9,007,378 B2
(45) Date of Patent: Apr. 14, 2015

(54) LOCATION TRACKING SYSTEM

(75) Inventor: Sung-Il Kim, Paju-si (KR)

(73) Assignee: Nextronics Co., Ltd. (KR)

( * ) Notice: Subject to any disclaimer, the term of this patent is extended or adjusted under 35 U.S.C. 154(b) by 207 days.

(21) Appl. No.: 13/696,084

(22) PCT Filed: Jul. 5, 2010

(86) PCT No.: PCT/KR2010/004351
§ 371 (c)(1),
(2), (4) Date: Nov. 5, 2012

(87) PCT Pub. No.: WO2011/139003
PCT Pub. Date: Nov. 10, 2011

(65) Prior Publication Data
US 2013/0050244 A1     Feb. 28, 2013

(30) Foreign Application Priority Data
May 7, 2010     (KR) .......................... 10-2010-0043175

(51) Int. Cl.
*G09G 5/00*     (2006.01)
*G08B 21/02*     (2006.01)
(Continued)

(52) U.S. Cl.
CPC .......... *G08B 21/0227* (2013.01); *G06F 3/0484* (2013.01); *G06T 11/00* (2013.01); *G01S 19/17* (2013.01); *G08B 21/0233* (2013.01)

(58) Field of Classification Search
USPC .............. 340/539.13, 573.4, 539.22; 725/52; 455/404.1
See application file for complete search history.

(56) References Cited

U.S. PATENT DOCUMENTS 7,034,695 B2 *   4/2006   Troxler ...................... 340/573.4
2002/0190861 A1   12/2002   Wentworth
(Continued)

FOREIGN PATENT DOCUMENTS

JP     09282565     10/1997
JP     2005202397   7/2005
(Continued)

OTHER PUBLICATIONS

International Search Report—PCT/KR2010/004351 dated Jun. 8, 2011.
Japanese Office Action—Japanese Application No. 2013-508967 issued on Jan. 28, 2014, citing JP2007-122123, JP 09-282565, JP 2009-296529, JP 2005-202397, JP 2008-305043 and JP 2009-205311.
European Search Report—European Application No. 10851091.8 issued on Aug. 6, 2014, citing US 2002/190861 and US 2005/062604.

*Primary Examiner* — Phi Hoang
(74) *Attorney, Agent, or Firm* — Cantor Colburn LLP

(57) ABSTRACT

Provided is a location tracking system in which a main terminal and a plurality of sub-terminals are configured to conduct wireless communication within a preset distance range which the sub-terminals should keep from the main terminal, and in which the main terminal has a plurality of display parts displaying the respective sub-terminals, whereas each sub-terminal has a warning sound output part. Thereby, when any sub-terminal deviates from a boundary of the preset distance range, the sub-terminal deviating from the boundary of the preset distance range is configured to be immediately displayed on the main terminal and to output a warning sound. Thus, during an outdoor group event (e.g., domestic or foreign travel, mountain climbing, an excursion, etc.), both a leader and participants are able to easily recognize the deviation from the boundary, and any participant can be prevented from becoming accidentally separated from a group. Further, a schedule for the group event, information (e.g. tourist resort) corresponding to the schedule, and a list of the participants are stored in the main terminal and each sub-terminal so as to be readable. The leader and the participants are able to easily read the schedule for the group event at any time, and the participants can maintain closer familiarity through the reading of information among them.

5 Claims, 4 Drawing Sheets

(51) Int. Cl.
*G06F 3/0484* (2013.01)
*G06T 11/00* (2006.01)
*G01S 19/17* (2010.01)

(56) References Cited

U.S. PATENT DOCUMENTS

| | | | |
|---|---|---|---|
| 2004/0183674 A1* | 9/2004 | Ruvarac | 340/539.13 |
| 2004/0199932 A1* | 10/2004 | Gottfurcht et al. | 725/52 |
| 2005/0048948 A1* | 3/2005 | Holland et al. | 455/404.1 |
| 2005/0062604 A1 | 3/2005 | Fong et al. | |
| 2005/0198063 A1* | 9/2005 | Thomas et al. | 707/102 |
| 2007/0229350 A1* | 10/2007 | Scalisi et al. | 342/350 |
| 2007/0247307 A1* | 10/2007 | Riep | 340/539.13 |
| 2010/0238033 A1* | 9/2010 | Blumel et al. | 340/573.4 |
| 2010/0253509 A1* | 10/2010 | Fu et al. | 340/539.22 |

FOREIGN PATENT DOCUMENTS

| | | |
|---|---|---|
| JP | 2007122123 | 5/2007 |
| JP | 2008305043 | 12/2008 |
| JP | 2009205311 | 9/2009 |
| JP | 2009296529 | 12/2009 |
| KR | 1020050009458 | 1/2005 |
| KR | 1020070071569 | 7/2007 |
| KR | 1020090016776 | 2/2009 |
| KR | 1020090051555 | 5/2009 |

* cited by examiner

LOCATION TRACKING SYSTEM

TECHNICAL FIELD

The present invention relates to a location tracking system, and more particularly, to a location tracking system in which a main terminal and a plurality of sub-terminals are configured to conduct wireless communication within a preset distance which the sub-terminals should maintain from the main terminal, and when any sub-terminal deviates from a boundary of the preset distance, the sub-terminal deviating from the boundary of the preset distance is immediately displayed on the main terminal and outputs a warning sound, so that, during an outdoor group event (e.g., domestic or foreign travel, mountain climbing, an excursion, etc.), any participant can be prevented from being accidentally separated from a group and losing his/her way.

BACKGROUND ART

In general, when children join adults in group events such as domestic or foreign travel, mountain climbing, or an excursion, a leader has a considerable difficulty leading participants of the group event.

In detail, to lead many participants, the leader should not only know personal information about the participants but also build up an emergency contact network. If any participant is accidentally separated from the group, the leader should find the separated participant through the emergency contact network.

If the separated participant is an adult having a portable terminal such as a mobile phone, the adult can be easily found through the emergency contact network. However, if the separated participant is a child such as a kindergarten pupil or a primary-school pupil having no portable terminal, it is impossible to activate the emergency contact network in order to find the child. For this reason, if such kindergarten or primary-school pupils participate in an outdoor event in a group, it is necessary for a leader to lead them diligently. A slight absence of mind may frequently result in a child becoming lost.

For this reason, devices for preventing children from becoming lost have been disclosed in the related art. These devices are configured so that a child and his/her guardian conduct one-to-one communication rather than one-to-many (group) communication over a local area network. Here, the child and his/her guardian carry child loss prevention terminals, and these terminals conduct short distance wireless communication within a preset distance range. If the terminals of the child and his/her guardian deviate from the preset distance range during the short distance wireless communication, a warning sound is adapted to be output from the guardian's terminal. Thereby, the guardian is able to recognize that the child has become separated.

However, these devices are configured so that the child and his/her guardian conduct one-to-one short distance wireless communication. The short distance wireless communication has a disadvantage in that, when the child's terminal deviates from the preset distance range, the warning sound is output from only the guardian's terminal, and is not output from the child's terminal. Thus, the child may not recognize that his/her terminal has deviated from the preset distance range. Accordingly, the guardian experiences the inconvenience that he/she should go to find the child beyond the preset distance range when the warning sound is output from his/her terminal. These devices are unfit for a group meeting.

DISCLOSURE

Technical Problem

Accordingly, an object of the present invention is to provide a location tracking system, in which one main terminal and a plurality of sub-terminals are configured to conduct wireless communication within a preset distance which the sub-terminals should keep from the main terminal, and in which the main terminal has a plurality of display parts displaying the respective sub-terminals, whereas each sub-terminal has a warning sound output part. Thereby, when any sub-terminal deviates from a boundary of the preset distance, the sub-terminal deviating from the boundary of the preset distance is configured to be immediately displayed on the main terminal and to output a warning sound. Thus, during an outdoor group event, both a leader and participants are able to easily recognize the deviation from the boundary, so that any participant can be prevented from becoming accidentally separated from a group.

Further, another object of the present invention is to provide a location tracking system in which a schedule for a group event, information corresponding to the schedule, and a list of participants are stored in a main terminal and sub-terminals so as to be readable, so that both a leader and participants can easily check the schedule for the group event at any time, and so that the participants can maintain closer familiarity through the reading of information among them.

Technical Solution

To accomplish the objects, the present invention provides a location tracking system in which: a main terminal mounted with a first wireless communication module and a plurality of sub-terminals, each of which is mounted with a second wireless communication module and has an identification code are configured to conduct wireless communication within a preset range; the main terminal includes a deviation display part that displays the plurality of sub-terminals having the identification code in a different color when at least one of the sub-terminals deviates from a preset safety range to enter a deviation boundary range; and each sub-terminal includes a warning sound output part that receives a control signal sent from the main terminal to output a warning sound when the deviation display part displays the deviation of the sub-terminal.

Here, the main terminal may further include: in addition to the first wireless communication module and the deviation display part, a memory part configured to store the identification codes of the plurality of sub-terminals and information about users carrying the respective sub-terminals; a first micro-computer configured to retrieve the information stored in the memory part and to control operations of the first wireless communication module, a first global positioning system (GPS) module, and the deviation display part; and a key input part including a retrieval key that outputs a signal for instructing the first micro-computer to retrieve the information stored in the memory part, an enter key that outputs a signal for instructing the first micro-computer to output a control signal for a warning sound, and a power key.

Further, the deviation display part may include a plurality of lamps that are displayed on a touch screen of the main terminal and correspond to a number of the sub-terminals, and the plurality of lamps may turn green or blue when the sub-terminals are within the preset safety range under the control of the first micro-computer, and red when the sub-terminals are within the deviation boundary range beyond the preset safety range under the control of the first micro-computer.

Also, the main terminal may further include a universal serial bus (USB) port configured to be able to input the information about the users and the information about the sub-terminals, and to delete and correct the input information.

Further, each sub-terminal may further include a second micro-computer that controls the second wireless communication module and the warning sound output part when receiving the control signal for the warning sound from first wireless communication module by wireless, in addition to the second wireless communication module and the warning sound output part.

Meanwhile, the main terminal and the sub-terminals may conduct the wireless communication with a radio frequency (RF) signal. The preset safety range between the main terminal and each sub-terminal may range from 0 to 20 meters, and the deviation boundary range between the main terminal and each sub-terminal may range from 20 to 30 meters.

In addition, the main terminal and each sub-terminal may have the same configuration and include first and second GPS modules so as to be able to carry out mutual location tracking. The main terminal and each sub-terminal may have respective memory parts in which a schedule for a group event, information corresponding to the schedule, and a list of participants are stored so as to be readable, so that a leader and each participant can easily read the stored information schedule through respective key input parts.

Advantageous Effects

According to the location tracking system of the present invention, a main terminal and a plurality of sub-terminals are configured to conduct wireless communication within a preset distance range which the sub-terminals should keep from the main terminal, and in which the main terminal has a plurality of display parts displaying the respective sub-terminals, whereas each sub-terminal has a warning sound output part. Thereby, when any sub-terminal deviates from a boundary of the preset distance range, the sub-terminal deviating from the boundary of the preset distance range is configured to be immediately displayed on the main terminal and to output a warning sound. Thus, during an outdoor group event (e.g., domestic or foreign travel, mountain climbing, an excursion, etc.), both a leader and participants are able to easily recognize the deviation from the boundary, and any participant can be prevented from becoming accidentally separated from a group. Further, a schedule for the group event, information (e.g. tourist resort) corresponding to the schedule, and a list of the participants are stored in the main terminal and each sub-terminal so as to be readable. The leader and the participants are able to easily read the schedule for the group event at any time, and the participants can maintain closer familiarity through the reading of information among them.

BEST MODE

Hereinafter, exemplary embodiments of the present invention will be described in detail with reference to the accompanying drawings.

Figure 1:
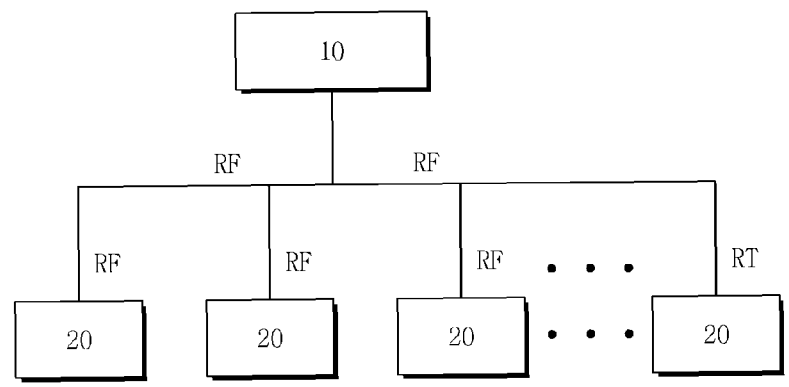
FIG. 1 is a schematic view showing an entire location tracking system according to an embodiment of the present invention.
Figure 2:
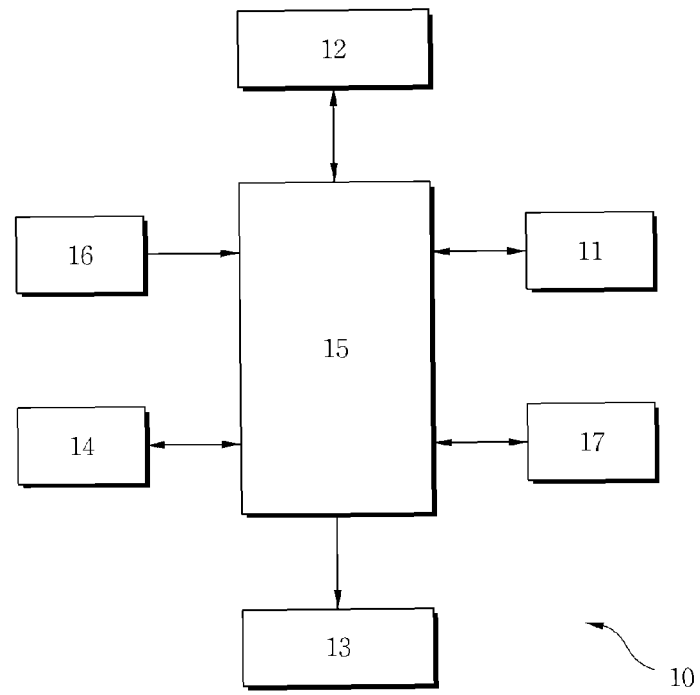
FIG. 2 shows a configuration of a main terminal included in the location tracking system according to the embodiment of the present invention.
Figure 3:
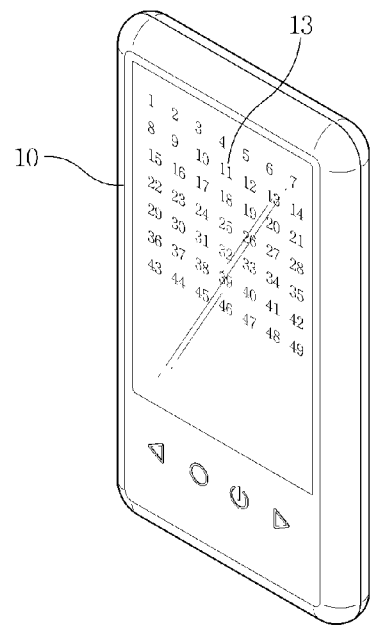
FIG. 3 is a schematic perspective view showing the main terminal included in the location tracking system according to the embodiment of the present invention.
Figure 4:
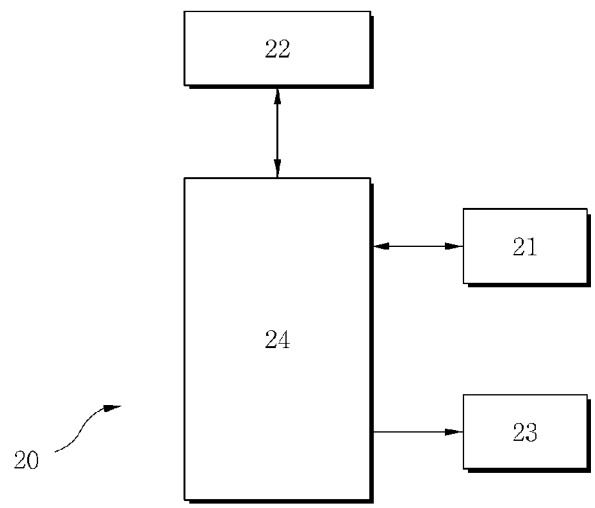
FIG. 4 shows a configuration of a sub-terminal included in the location tracking system according to the embodiment of the present invention.
Figure 5:
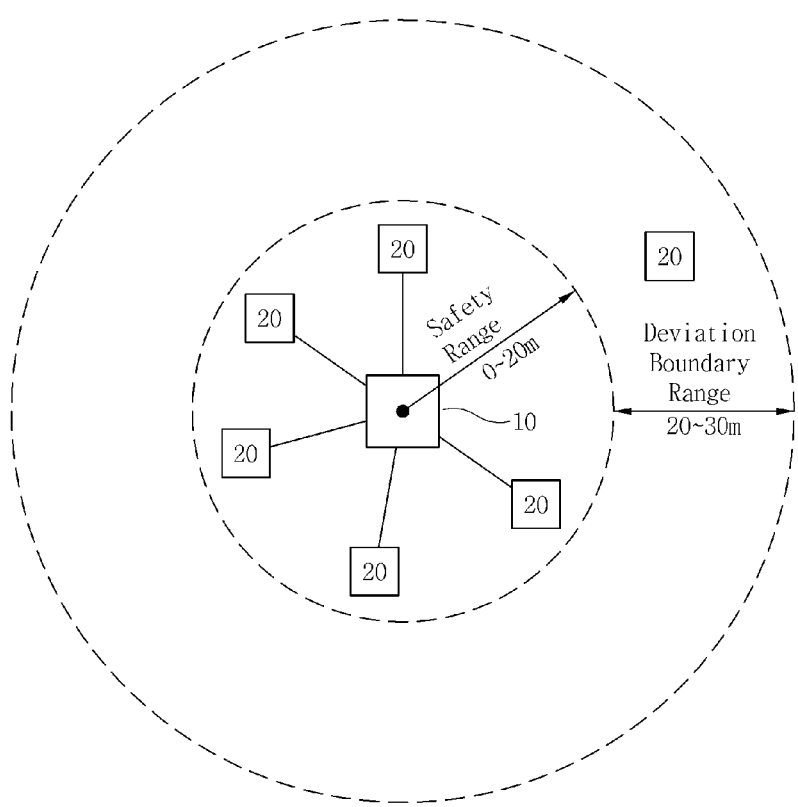
FIG. 5 shows an operation of the location tracking system according to the embodiment of the present invention.

FIG. 1 is a schematic view showing an entire location tracking system according to an embodiment of the present invention. FIG. 2 shows a configuration of a main terminal included in the location tracking system according to the embodiment of the present invention. FIG. 3 is a schematic perspective view showing the main terminal included in the location tracking system according to the embodiment of the present invention. FIG. 4 shows a configuration of a sub-terminal included in the location tracking system according to the embodiment of the present invention. FIG. 5 shows an operation of the location tracking system according to the embodiment of the present invention.

Referring to FIGS. 1 to 5, the location tracking system according to the embodiment of the present invention includes a main terminal 10 which a leader carries, and a plurality of sub-terminals 20 which respective participants carry.

The main terminal 10 includes a first wireless communication module 11 that enables short distance wireless communication to be conducted within the plurality of sub-terminals 20, a deviation display part 13, a memory part 14, a first micro-computer 15, a key input part 16, and a universal serial bus (USB) port 17.

The deviation display part 13 is made up of a plurality of lamps, which are displayed on a touch screen of the main terminal 10 and correspond to the number of sub-terminals 20. Under the control of the first micro-computer 15, the plurality of lamps turn green or blue when the sub-terminals 20 are located within a preset safety range, and red when the sub-terminals 20 are located within a deviation boundary range beyond the preset safety range.

Here, the preset safety range between the main terminal 10 and each sub-terminal 20 ranges from 0 to 20 meters, and the deviation boundary range between the main terminal 10 and each sub-terminal 20 ranges from 20 to 30 meters.

The memory part 14 stores information about identification codes of the sub-terminals 20 and about the participants who carry the sub-terminals 20. The information is configured to be stored and corrected through the USB port 17.

The first micro-computer 15 retrieves the information stored in the memory part 14, and is mounted with a program controlling operations of the first wireless communication module 11, a first global positioning system (GPS) module 12, and the deviation display part 13. The first micro-computer 15 performs a control operation so that, during short distance wireless communication with the sub-terminals 20 through the first wireless communication module 11, when the sub-terminals 20 are within the safety range and the deviation boundary range, the leader and the participants can recognize this.

The key input part 16 includes a retrieval key that outputs a signal for instructing the first micro-computer 15 to retrieve the information stored in the memory part 14, an enter key that outputs a signal for instructing the first micro-computer 15 to output a control signal for a warning sound, and a power key that instructs the supply of power, and is disposed on the front face of the main terminal 10.

Each sub-terminal 20 is assigned a code which the main terminal 10 identifies during the short distance wireless communication with the main terminal 10, and includes a second wireless communication module 21 that enables the short distance wireless communication to be conducted with the main terminal 10, a warning sound output part 23, and a second micro-computer 24.

The warning sound output part 23 is configured to receive a control signal sent from the main terminal 10 when the deviation display part 13 displays the deviation information and then to output a warning sound so as to enable any participant to recognize the deviation. When the control signal for the warning sound is received by wireless communication between the first and second wireless communication modules 11 and 21, the second micro-computer 24 is configured to control the warning sound output part 23.

That is, the location tracking system according to the embodiment of the present invention is configured so that, during group travel, the leader carries the main terminal 10, and the participants carry the respective sub-terminals 20.

Here, the information about the participants is stored in the memory part 14 of the main terminal 10 through the USB port 17 and is administered by the leader. In this state, the ranges for the short distance wireless communication between the first and second wireless communication modules 11 and 21 included in the main terminal 10 and the sub-terminal 20 are set.

That is, in the short distance wireless communication between the first and second wireless communication modules 11 and 21 included in the main terminal 10 and the sub-terminal 20, the safety range is set to a radius range of 0 to 20 meters, and the deviation boundary range is set to a radius range of 20 to 30 meters.

Then, when both the leader having the main terminal 10 and the participants having the sub-terminals 20 are within the safety range, the lamps of the deviation display part 13 displayed on the touch screen of the main terminal 10 turn green or blue under the control of the first micro-computer 15.

In contrast, when some of the participants are separated from the safety range and enter the deviation boundary range, some of the lamps of the deviation display part 13, particularly some lamps indicating the sub-terminals 20 of the participants within the deviation boundary range, turn red under the control of the first micro-computer 15.

Then, the leader recognizes that the lamps have turned red, and presses the enter key included in the key input part 16 of the main terminal 10. Thus, the signal from the enter key is sent wirelessly to the second wireless communication module 21 included in the sub-terminal 20 of each participant within the deviation boundary range through the first wireless communication module 11.

Then, the second micro-computer 24 of the sub-terminal 20 controls the warning sound output part 23 so as to output a warning sound. Thus, the output warning sound enables the participants to recognize that they are separated from the safety range of the group travel, and guides the participants to move into the safety range. Accordingly, the leader can effectively administer the plurality of participants at any place.

MODE FOR INVENTION

Figure 6:
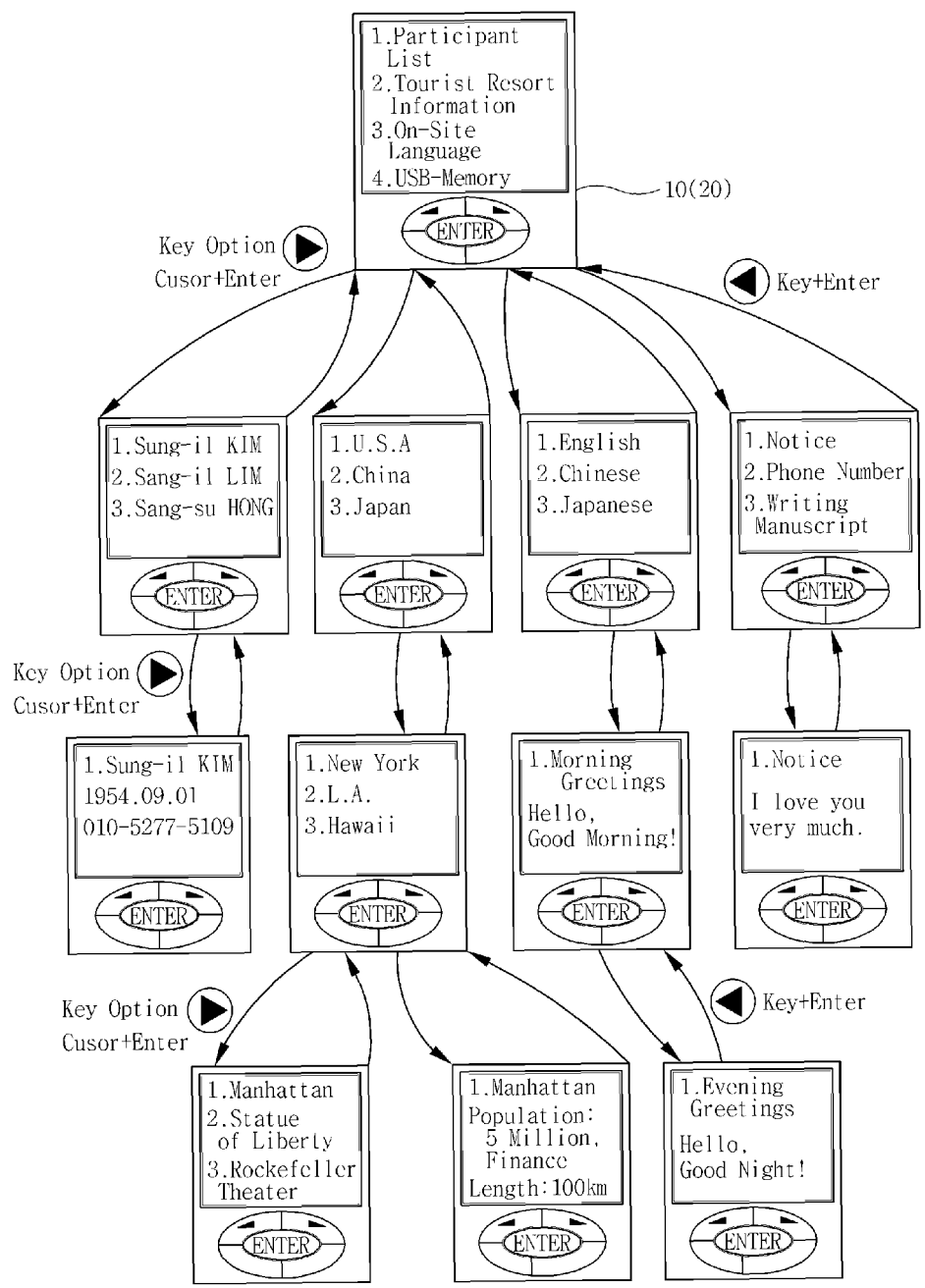
FIG. 6 shows how to use a main terminal and sub-terminals included in a location tracking system according to another embodiment of the present invention, in which the main terminal and each sub-terminal have the same configuration and retrieval information.

On the other hand, as in FIG. 6, the main terminal 10 which the leader carries and the sub-terminal 20 which each participant carries may have the same configuration. In this case, the memory part, the key input part, and the USB port constituting the main terminal 10 are included in each sub-terminal 20. Alternatively, as in FIGS. 2 and 3, first and second GPS modules 12 and 22 may be installed on the main terminal 10 and the sub-terminal 20 so as to enable location tracking regardless of a distance in addition to the short distance wireless communication.

Thus, a schedule for a group event, information (e.g. tourist resort) corresponding to the schedule, and a list of participants are stored in the main terminal and the sub-terminals so as to be readable. The leader and the participants are able to easily read the stored information through the key input parts. Thereby, the leader and the participants in the group event can check a purpose or a detailed schedule of the group event, information about a visiting place, and information (e.g., name or phone number) about the other participants, so that an effect of having an increasing interest in the group event can be expected. Further, even when the main terminal and the sub-terminals are beyond the short distance wireless communication range, the locations of the leader and the participants can be more easily tracked through the first and second GPS modules 12 and 22.

The present invention is not limited to the specific embodiments. Thus, it will be understood by those skilled in the art that a variety of modifications and variations may be made to the present invention without departing from the spirit or scope of the present invention defined in the appended claims.

INDUSTRIAL APPLICABILITY

As described above, the present invention is configured to allow the leader and participants who participate in the outdoor group event to easily recognize the boundary deviation state, to prevent the participants from becoming accidentally separated from the group, to allow the leader and participants to easily check the schedule for the group event at any time, and to allow the participants to maintain closer familiarity through the reading of information among them.

The invention claimed is:

1. A location tracking system in which
a main terminal mounted with a first wireless communication module and a plurality of sub-terminals, each of which is mounted with a second wireless communication module and has an identification code, are configured to conduct wireless communication within a preset range,
the main terminal includes a deviation display part that displays the plurality of sub-terminals having the identification code in a different color when at least one of the sub-terminals deviates from a preset safety range and enters a deviation boundary range, and
each sub-terminal includes a warning sound output part that receives a control signal sent from the main terminal to output a warning sound when the deviation display part displays the deviation of the sub-terminal, wherein:
the deviation display part includes a plurality of lamps that are displayed as numbers on a touch screen of the main terminal, and each of the lamps corresponds to one of the plurality of sub-terminals;
the plurality of lamps are arranged in rows and columns so as to be displayed on the touch screen of the main terminal in a manner that is neutral to distances of the corresponding sub-terminals from the main terminal;
each of the plurality of lamps is turned green or blue when the corresponding sub-terminal is within the preset safety range under the control of the first micro-computer, and red when the corresponding sub-terminal is within the deviation boundary range beyond the preset safety range under the control of the first micro-computer;
the main terminal further includes an enter key that outputs a signal for instructing the first micro-computer to output a control signal for a warning sound to all of the sub-terminals of which the corresponding lamps are turned red; and
each sub-terminal further includes a second micro-computer that controls the second wireless communication module and the warning sound output part when receiving the control signal for the warning sound from first wireless communication module by wireless.

2. The location tracking system according to claim 1, wherein the main terminal further includes: in addition to the first wireless communication module and the deviation display part,
a memory part configured to store the identification codes of the plurality of sub-terminals and information about users carrying the respective sub-terminals;
a first micro-computer configured to retrieve the information stored in the memory part and to control operations of the first wireless communication module, a first global positioning system (GPS) module, and the deviation display part; and
a key input part including a retrieval key that outputs a signal for instructing the first micro-computer to retrieve the information stored in the memory part, and a power key.

3. The location tracking system according to claim 2, wherein the main terminal further includes a universal serial bus (USB) port configured to be able to input the information about the users and the information about the sub-terminals, and to delete and correct the input information.

4. The location tracking system according to claim 1, wherein the main terminal and the sub-terminals conduct the wireless communication with a radio frequency (RF) signal, the preset safety range between the main terminal and each sub-terminal ranges from 0 to 20 meters, and the deviation boundary range between the main terminal and each sub-terminal ranges from 20 to 30 meters.

5. The location tracking system according to claim 1, wherein:
the main terminal and each sub-terminal have the same configuration and include first and second GPS modules so as to be able to carry out mutual location tracking; and
the main terminal and each sub-terminal have respective memory parts in which a schedule for a group event, information corresponding to the schedule, and a list of participants are stored so as to be readable, so that a leader using the main terminal and each participant using a sub-terminal share the same schedule, the same information and the same list through respective key input parts of the main terminal or the sub-terminal.

\* \* \* \* \*